Jan. 28, 1936.  G. C. HIGBEE  2,029,070
HYDRAULIC SAFETY BRAKE FOR AUTOMOBILES
Filed Jan. 22, 1935
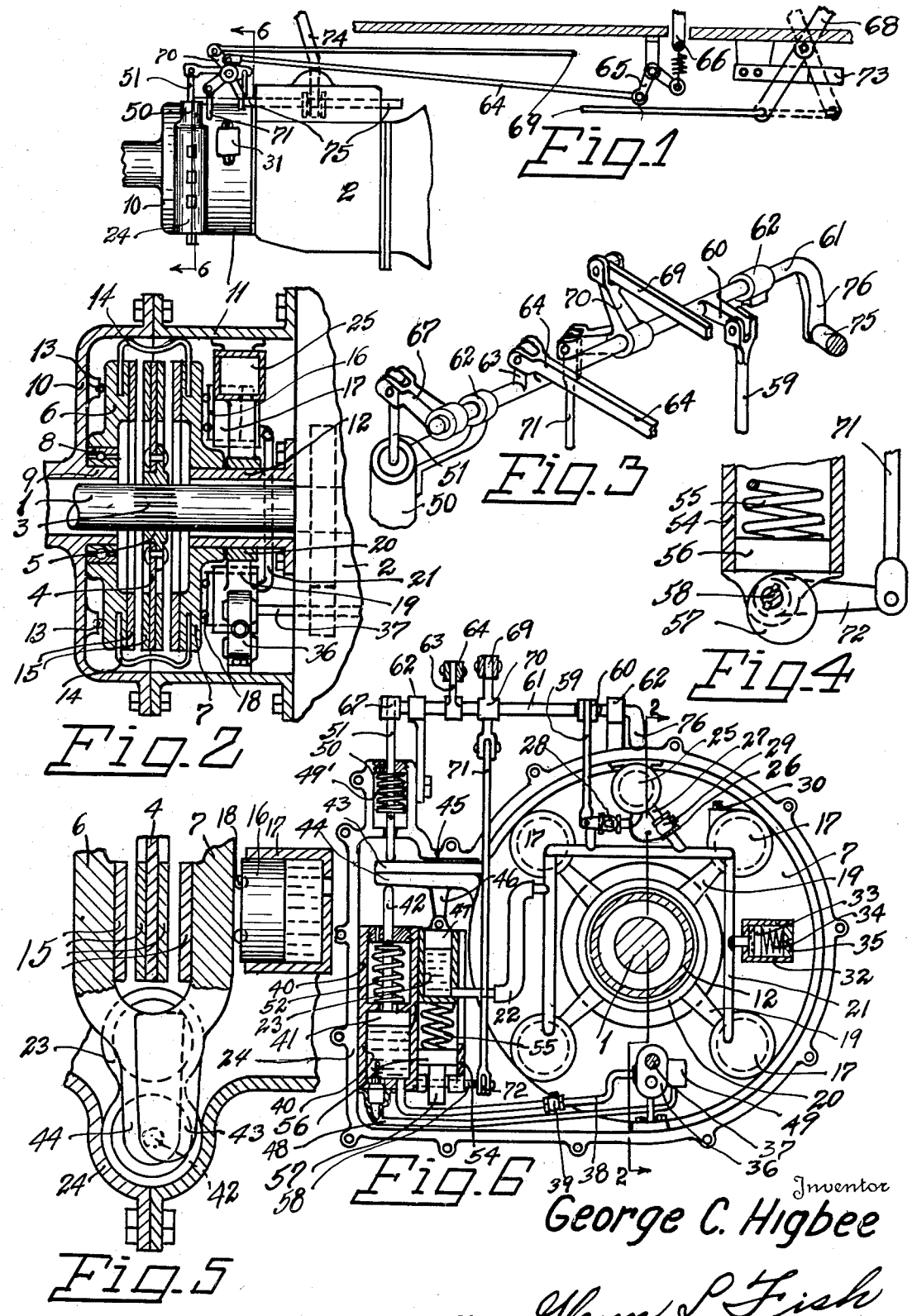
Inventor
George C. Higbee
By Glenn L. Fish
Attorney Patented Jan. 28, 1936

2,029,070

UNITED STATES PATENT OFFICE 2,029,070

HYDRAULIC SAFETY BRAKE FOR AUTOMOBILES

George C. Higbee, Tekoa, Wash.

Application January 22, 1935, Serial No. 2,853

8 Claims. (Cl. 192—4)

This invention relates to an improved hydraulic safety brake for automobiles and one object of the invention is to provide a brake which may be associated with the drive shaft or rear axle of a motor vehicle and operated from the transmission to prevent the vehicle from moving rearwardly except when the gear shifting mechanism is in reverse.

Another object of the invention is to so construct this hydraulic brake that it will not interfere with forward movement of a motor vehicle but at the same time will be automatically applied when the vehicle is stopped and prevent rearward movement thereof except when the gear shift mechanism is in reverse. Therefore, an automobile will be prevented from coasting rearwardly down hill if parked or the engine stalls while traveling up a hill and also the operator does not have to act any quicker when shifting gears on a hill than upon a level road.

Another object of the invention is to provide an apparatus of this character which when in operative condition will permit an automobile to be driven forwardly either at low or high speed but very effectively prevent rearward movement of the vehicle except when in reverse, manually operated means being provided for operating the apparatus so that the apparatus may be used as an emergency brake and an automobile quickly stopped.

The invention is illustrated in the accompanying drawing, wherein

Figure 1 is a side elevation of the improved apparatus.

Figure 2 is a longitudinal section taken vertically through the apparatus along the line 2—2 of Figure 6.

Figure 3 is a perspective view of the operating levers.

Figure 4 is a detailed view of a cam action forming part of the apparatus.

Figure 5 is a fragmentary sectional view of the apparatus.

Figure 6 is a section taken along the line 6—6 of Figure 1.

This improved hydraulic safety brake has been shown with the drive shaft 1 extending from the transmission, indicated in general by the numeral 2, and is rotated from the engine through the usual transmission gearing, indicated by dotted lines in Figure 2. The drive shaft is splined, as shown at 3, and about this portion of the shaft is disposed a center disk 4 having a hub 5 which is engaged with the splines to cause the center disk to rotate with the drive shaft but permit sliding of the disk along the shaft. This sliding movement is approximately three-eighths of an inch. At opposite sides of the center disk are disposed side disks 6 and 7, the disk 6 being loosely mounted about a bearing 8 carried by a sleeve 9 at the center of the outer section or cap 10 of a casing or housing 11 which is secured by bolts to the rear end of the transmission casing. The forward side disk fits loosely about a sleeve 12 bolted to the rear end of the transmission casing in alinement with the sleeve 9 and attention is called to the fact that the disk 7 may be shifted along the sleeve 12. Ball bearings are located between the rear disk 6 and the head of the cap 11, as shown at 13, and serve as a thrust bearing for this disk. A number of U-shaped springs 14 which extend across the center disk and have their arms anchored in the side disks yieldably hold the disks spaced from each other but permit the disk 7 to be forced toward the disk 6 until it engages the center disk and shifts the center disk along the shaft into engagement with the rear disk 6. All of the disks are faced with friction plates or pads 15 so that when the disks are brought together they will firmly grip each other and operate as a unit. When pressure upon the disk 7 is released the springs expand and the disks resume their normal spaced relation shown in Figure 2.

In order to shift the disk 7 along the sleeve 12 toward the center disk there have been provided pistons 16 which operate in cylinders 17 and at their outer rear faces carry bearing balls 18 to engage the forward disk 7 and reduce friction between the disk and pistons. Four cylinders have been shown, although any number desired may be used, and these cylinders are carried by arms 19 which radiate from a ring or collar 20 fitting about the sleeve 12 forwardly of the disk 7. A pipe line 21 supplies oil to the cylinders and has communication through a flexible pipe or hose 22 with a cylinder 23 disposed vertically in a side chamber 24 of the casing, as shown in Figure 6, in offset relation to the disks. The pipe line also communicates with an auxiliary tank 25 suspended from the upper portion of the casing, such communication being established through pipes 26 and 27, the pipe 26 having a shut off valve 28 and the pipe 27 a check valve 29. The pipe line and cylinders are filled with oil through an inlet provided in one cylinder and normally closed by a threaded plug 30, access to the plug and filling opening being had through an opening formed in the casing 11 and normally closed by a plate 31 shown in Figure 1. Pressure in the pipe line is regulated by a pressure regulator consisting of a cup or cylinder 32 communicating with the pipe line and housing a disk or piston 33 which is yieldably held against outward movement by a spring 34, the tension of which is regulated by a cap or plug 35 screwed into the outer end of the cup.

When the automobile is moving forwardly a pump 36 driven from the transmission by the shaft 37 forces oil through the pipe 38 past the check valve 39 into the lower end of the cylinder 40 and oil in this cylinder will exert sufficient pressure to hold the piston 41 in an elevated position with its stem 42 pressed against the overlapped arms 43 and 44 of the disks 6 and 7. These arms are limited in their upward movement by engagement with the upper end of the side chamber 24, as shown at 45 in Figure 6, and the arm 44 carries a depending horn or fulcrum 46 to which is pivoted a piston 47 working in the cylinder 23. Return of oil from the cylinder 40 is established through a pipe 48 leading to the sump tank 49 of the pump.

When the automobile stops, operation of the pump also stops and oil in the cylinder 40 is relieved from pressure exerted by the pump. The piston 41 and arms 43 and 44 will then be forced downwardly by action of a strong spring 49' which is housed in a chamber 50 over the side chamber 24 and exerts downward force upon a plunger 51 having its lower end bearing against the upper face of the arm 43 of the disk 7. This spring 49' is stronger than the spring 52 housed in the cylinder 40 about the stem 42 of the piston 41 and serving to assist upward movement of the piston. As the arms of the side disks are forced downwardly, the piston 47 will be forced downwardly in the cylinder 23, thus forcing oil out of this cylinder and through the pipe line 21 to the cylinders 17 and the pistons 16 will be forced outwardly to shift the disk 7 along the sleeves 12 into engagement with the center disk 4, both of these disks being then moved longitudinally of the shaft 1 until the center disk engages the side disk 6 and is gripped between the two side disks. A braking action will thus be applied to the center disk and drive shaft but the automobile may still coast forwardly as the gripping action will not be sufficient to abruptly stop such movement. If the automobile attempts to move rearwardly after stopping, the side disks will turn with the center disk in a direction to swing the arms 43 and 44 downwardly. Additional pressure will be applied to oil in the cylinder 23 by movement of the piston 47 and the pistons 16 caused to create greater gripping action between the disks. Therefore, the automobile will be firmly held against rearward movement even upon a steep hill. Ball bearings 18 provided between the pistons 16 and side disk 7 reduce friction and wear. The cylinder 23 is slidable vertically in a cylindrical casing or guide 54 formed in the chamber 24 and rests upon a spring 55 which serves as a shock absorber and is adjustably supported by a piston 56. The piston 56 rests upon a cam 57 carried by a shaft 58 which extends diametrically of the guide and is rotatably mounted in bearings at the bottom of the guide with the cam normally disposed in the position shown in Figure 4. By providing the spring, force of blows delivered to the piston 47 will be absorbed and damage to parts prevented.

In order to drive the automobile forwardly after being stopped, pressure upon the pistons must be released and in order to do so the valve 28 of the pipe 26 must be opened. This valve is actuated by a rod or link 59 pivoted at its upper end to an arm 60 extending from a control shaft 61 which extends transversely of the casing 11 and is mounted in bearing brackets 62. The control shaft also carries an arm 63 to which is pivoted a rod 64 having its other end pivoted to a bell crank 65 forming part of the operating mechanism 66 and from an inspection of Figures 1, 2, and 3 it will be seen that when this operating mechanism is actuated to shift the rod 64 forwardly the shaft will be rotated to act upon the link 59 and open the valve 28 so that oil can escape from the pipe line 8 into the tank 25. Pressure upon the pistons 16 will thus be released and the disks 4, 6, and 7 will be separated and return to their initial positions permitting free forward movement of the automobile. As the upper end of the plunger 51 is pivoted to the arm 67 of the shaft 58 this plunger will be drawn upwardly as the valve is opened and as the piston 47 is drawn upwardly by force applied by the piston rod 42 bearing against the arms 43 and 44, oil will be sucked back into the cylinder 23 and from the tank through the check valve 29. It will, of course, be understood that whenever the plunger 51 is moved downwardly by its spring 49' the shaft will be rotated to close the valve 28 and thus permit pressure to be applied to the oil to force the disk toward each other.

It is desired to employ this apparatus as an emergency brake to stop forward movement of an automobile when necessary and in order to do so the shaft 61 is connected with the emergency brake lever 68 by a rod 69. This rod is pivoted to the lower end of the brake lever and to a bell crank 70 which fits loosely about the shaft 61 and has its other arm pivoted to a rod 71, the lower end of which is pivoted to an arm 72 carried by the shaft 58. When the emergency brake lever is moved to the position indicated by dotted lines where it is held by the spring latch 73, the shaft 58 will be rotated to swing the cam 57 upwardly and raise the piston or spring supporting block 56, thus compressing the spring and causing the cylinder 23 to be shifted upwardly. As the cylinder is shifted upwardly, pressure will be applied to the oil and the pistons 16 will be extended to move the disks into tight gripping engagement with each other. The automobile will be quickly brought to a stop and movement either forwardly or rearwardly prevented until the brake lever is released and the cam 55, spring 55 and cylinder 23 return to their normal position in which oil will be sucked back into the cylinder and release the clutch disks.

In order to permit operation of the automobile in reverse, the gear shift lever 74 is moved to shift the rod or shaft 75 longitudinally toward the crank arm 76 of the shaft 61 and rotate the shaft in a direction to raise the plunger 51 and open the valve 28. This immediately releases pressure upon the pistons 16 and the clutch disks will remain separated so that the automobile can be driven rearwardly in reverse.

The automobile can, therefore, be driven forwardly or rearwardly but when the transmission is set for forward driving, rearward movement will be prevented by the hydraulic clutch in a very effective manner and rearward movement down a hill cannot take place and cause wrecking of the automobile and injury to occupants thereof.

Having thus described the invention, what is claimed as new is:

1. In a structure of the character described, a rotary shaft, means for controlling rotation of said shaft including a disk rotating with the shaft and a companion disk loose about the shaft, hydraulic means automatically operated for controlling shifting of the companion disk into and out of position to grip the first disk and prevent rotation of the shaft in one direction, means for relieving the companion disk from pressure by the hydraulic means, and manually controlled means for operating the hydraulic means and preventing rotation of the shaft in either direction.

2. In a structure of the character described, a rotary shaft having a transmission associated therewith including a gear shift shaft slidable longitudinally, means for controlling rotation of said shaft including hydraulic means having actuating means engaged with one end of the gear shift shaft whereby the hydraulic means will be automatically operated to prevent reverse rotation of the shaft when the transmission is in position for rotation of the shaft, manually operated means for energizing the hydraulic means and preventing rotation of the shaft in either direction, and manually operated means for rendering the hydraulic means inoperative and permitting rotation of the shaft in either direction.

3. In a structure of the character described, a rotary shaft having a transmission associated therewith including a slidable gear shift shaft, a brake including disks normally spaced from each other to permit rotation of the shaft, hydraulic means for shifting the disks into gripping engagement with each other to permit forward rotation of the rotary shaft and prevent reverse rotation of the shaft, means actuated by the gear shift shaft to render said hydraulic means inoperative when the gear shift is in reverse and permit reverse rotation of the rotary shaft, and manually controlled means for actuating the hydraulic means.

4. In a structure of the character described, a rotary main shaft having a transmission associated therewith including a slidably mounted gear shift shaft, a casing about said shaft, a center disk rotating with said shaft and slidable along the shaft, front and rear side disks loose about the shaft, the center disk and front side disk being shiftable toward the rear side disk to effect gripping of the center disk between the side disks, hydraulic means for applying pressure to the front side disk to effect the said shifting of the front side disk and center disk, means for releasing pressure of said hydraulic means, and means actuated by movement of the gear shift shaft in a reversing direction to render the hydraulic means temporarily inoperative.

5. In a structure of the character described, a rotary main shaft having a transmission associated therewith including a slidably mounted gear shift shaft, a casing about said shaft, a center disk rotating with said shaft and slidable along the shaft, front and rear side disks loose about the shaft, the center disk and front side disk being shiftable toward the rear side disk to effect engagement of the center disk between the side disks, hydraulic means for applying pressure to the front side disk and stop rotation of the main shaft forwardly, means for causing the hydraulic means to apply greater pressure and prevent rearward rotation of the main shaft after stopping, means for releasing pressure of said hydraulic means, and means actuated by movement of the gear shift shaft in a reversing direction to render the hydraulic means temporarily inoperative.

6. In a structure of the character described, a transmission including a main shaft, a rotary pump shaft, and a longitudinally slidable gear shift shaft controlling forward and reverse rotation of the main shaft, a casing at the rear of transmission about the main shaft, front and rear sleeves in the casing about the main shaft, a center disk carried by said shaft between the sleeves, said disk rotating with the shaft and being shiftable along the shaft, front and rear side disks loose about said sleeves, the front disk being shiftable along the front sleeve and yieldably held against movement towards the rear sleeve to space the center disk and side disks from each other, hydraulic means for shifting the front disk rearwardly and cause the center disk to be gripped between the side disks, means for automatically operating said hydraulic means and preventing reverse rotation of said shaft, manually actuated means for operating the hydraulic means and preventing rotation of the shaft forwardly or rearwardly, and means actuated by when the gear shift shaft is shifted in a reversing direction and temporarily prevent operation of the hydraulic means whereby the main shaft may be rotated in reverse.

7. In a structure of the character described, a transmission including a main shaft, a pump shaft, and a gear shift shaft for controlling rotation of the main shaft, sleves about the main shaft rearwardly of the transmission, a center disk between said sleeves turning with the main shaft and shiftable longitudinally thereon, front and rear disks loose about said sleeves for gripping the center disk when the front disk is shifted toward the rear disk, a mounting in front of the front disk, operating cylinders carried by said mounting, pistons in said cylinders engaging the front disk, a power cylinder, a pipe line connecting the power cylinder with the operating cylinder, a working piston in said power cylinder connected with extensions of the front and rear disks, a spring pressed plunger for applying pressure to the extensions of the front and rear disks and forcing the working piston into its cylinder to apply pressure to liquid in the pipe line and operating cylinders and force the pistons of the operating cylinders outwardly, an auxiliary receptacle having valve controlled communication with the pipe line, a pressure cylinder, a pump operated by the pump shaft and communicating with the pressure cylinder, and a piston in the pressure cylinder acting upon the extensions of the disks in opposition to said plunger.

8. In a structure of the character described, a rotary main shaft, a longitudinally slidable gear shift shaft, a casing about said main shaft, a disk rotating with the main shaft, a front disk loose about the main shaft and shiftable longitudinally thereof into and out of position for gripping the first disk, a rear disk loose about the main shaft, working cylinders in front of the front disk, pistons in the cylinders engaging the front disk, a side extension for the front disk, a side extension for the rear disk, a power cylinder shiftable vertically, a pipe line connecting the power cylinder with the working cylinders, a piston carried by the side extension of the rear disk and operating in the power cylinder, a second vertical cylinder, a piston in the second vertical cylinder engaging the under face of the side extension of the rear disk to elevate the side extension and piston of the side power cylinder, a plunger bearing against the upper face of the side extension of the front disk, a rock shaft having an arm pivoted to said plunger, an auxiliary container having inlet and outlet pipes opening into the pipe line, a check valve in the outlet pipe, a plug valve in the inlet pipe operated from said rock shaft, operating mechanism for operating the rock shaft, a crank arm carried by the rock shaft and engageable by the gear shift shaft to operate the rock shaft, a cam for shifting the power cylinder and applying pressure to liquid in the power cylinder and pipeline, and actuating means for said cam including a brake lever and a bell crank loose upon the rock shaft.

GEORGE C. HIGBEE.